(12) United States Patent
Obrovac et al.

(10) Patent No.: US 10,916,770 B2
(45) Date of Patent: Feb. 9, 2021

(54) SILICON BASED MATERIALS FOR AND METHODS OF MAKING AND USING SAME

(71) Applicant: JOHNSON MATTHEY PUBLIC LIMITED COMPANY, London (GB)

(72) Inventors: Mark N. Obrovac, Nova Scotia (CA); Leyi Zhao, Nova Scotia (CA); Vincent J. L. Chevrier, St. Paul, MN (US)

(73) Assignee: Johnson Matthey Public Limited Company, London (GB)

( * ) Notice: Subject to any disclaimer, the term of this patent is extended or adjusted under 35 U.S.C. 154(b) by 143 days.

(21) Appl. No.: 16/066,322

(22) PCT Filed: Dec. 19, 2016

(86) PCT No.: PCT/US2016/067431
§ 371 (c)(1),
(2) Date: Jun. 27, 2018

(87) PCT Pub. No.: WO2017/116783
PCT Pub. Date: Jul. 6, 2017

(65) Prior Publication Data
US 2019/0006666 A1    Jan. 3, 2019

Related U.S. Application Data

(60) Provisional application No. 62/271,368, filed on Dec. 28, 2015.

(51) Int. Cl.
*H01M 4/38*     (2006.01)
*H01M 4/62*     (2006.01)
(Continued)

(52) U.S. Cl.
CPC .......... *H01M 4/386* (2013.01); *H01M 4/134* (2013.01); *H01M 4/38* (2013.01); *H01M 4/405* (2013.01);
(Continued)

(58) Field of Classification Search
CPC ........ H01M 4/386; H01M 4/134; H01M 4/38; H01M 4/405; H01M 4/622; H01M 4/625; H01M 10/0525; H01M 10/058
See application file for complete search history.

(56) References Cited

U.S. PATENT DOCUMENTS

2003/0190526 A1   10/2003   Saidi et al.
2006/0046144 A1    3/2006   Obrovac
(Continued)

FOREIGN PATENT DOCUMENTS

JP    2009514181 A    4/2009
JP    2009259694 A   11/2009
(Continued)

*Primary Examiner* — Jimmy Vo
(74) *Attorney, Agent, or Firm* — BakerHostetler

(57) ABSTRACT

An electrochemically active material includes silicon and a transition metal. At least 50 mole % of the transition metal is present in its elemental state, based on the total number of moles of transition metal elements present in the electrochemically active material. An electrochemically active material includes silicon and carbon. At least 50 mole % of the carbon is present in its elemental state, based on the total number of moles of carbon present in the electrochemically active material.

17 Claims, 8 Drawing Sheets

(51) Int. Cl.
- *H01M 4/40* (2006.01)
- *H01M 4/134* (2010.01)
- *H01M 10/0525* (2010.01)
- *H01M 10/058* (2010.01)
- *B82Y 30/00* (2011.01)
- *H01M 4/02* (2006.01)

(52) U.S. Cl.
CPC ........... *H01M 4/622* (2013.01); *H01M 4/625* (2013.01); *H01M 10/058* (2013.01); *H01M 10/0525* (2013.01); *B82Y 30/00* (2013.01); *H01M 2004/021* (2013.01); *H01M 2004/027* (2013.01)

(56) References Cited

U.S. PATENT DOCUMENTS

| | | | |
|---|---|---|---|
| 2011/0031935 A1 | 2/2011 | Miyoshi et al. | |
| 2011/0215280 A1 | 9/2011 | Obrovac et al. | |
| 2016/0141614 A1* | 5/2016 | Suh | C22C 1/02 252/182.1 |

FOREIGN PATENT DOCUMENTS

| | | | |
|---|---|---|---|
| JP | 2010501970 A | 1/2010 | |
| JP | 2015125816 A | 7/2015 | |
| WO | 2007053704 A2 | 5/2007 | |
| WO | 2015114640 A1 | 8/2015 | |

\* cited by examiner

SILICON BASED MATERIALS FOR AND METHODS OF MAKING AND USING SAME

CROSS REFERENCE TO RELATED APPLICATIONS

This application is a national stage filing under 35 U.S.C. 371 of PCT/US2016/067431, filed Dec. 19, 2016, which claims the benefit of U.S. Provisional Application No. 62/271,368, filed Dec. 28, 2015, the disclosure of which is incorporated by reference in their entirety herein.

FIELD

The present disclosure relates to silicon based materials and, in some embodiment compositions including such materials that are useful in anodes for lithium ion batteries and methods for preparing and using the same.

BACKGROUND

Various anode compositions have been introduced for use in lithium-ion batteries. Such compositions are described, for example, in Nature Nanotechnology 9 (2014) 187. by Nian Liu et al., U.S. Pat. No. 6,203,944 by Turner et al., and U.S. Pat. No. 7,906,238 by Le.

SUMMARY

In some embodiments, an electrochemically active material is provided. The electrochemically active material includes silicon and a transition metal. The electrochemical active material includes at least 50 mole % transition metal in its elemental state, based on the total number of moles of transition metal elements present in the electrochemically active material.

In some embodiments, an electrochemically active material is provided. The electrochemically active material includes silicon and carbon. Prior to incorporation of the electrochemically active material into an electrochemical cell, the electrochemically active material bears on an exterior surface thereof a coating that comprises an alkali metal decomposition product. The electrochemical active material includes at least 50 mole % carbon in its elemental state, based on the total number of moles of carbon present in the electrochemically active material.

In some embodiments, an electrode composition is provided. The electrode composition includes any of the above-described electrochemically active materials and a binder.

In some embodiments, a negative electrode is provided. The negative electrode includes a current collector and the above-described electrode composition.

In some embodiments, an electrochemical cell is provided. The electrochemical cell includes the above-described negative electrode, a positive electrode comprising a positive electrode composition comprising lithium, and an electrolyte comprising lithium.

In some embodiments, a method of making an electrochemical cell is provided. The method includes providing a positive electrode comprising a positive electrode composition comprising lithium, providing a negative electrode as described above, providing an electrolyte comprising lithium, and incorporating the positive electrode, negative electrode, and the electrolyte into an electrochemical cell.

The above summary of the present disclosure is not intended to describe each embodiment of the present disclosure. The details of one or more embodiments of the disclosure are also set forth in the description below. Other features, objects, and advantages of the disclosure will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Figure 1:
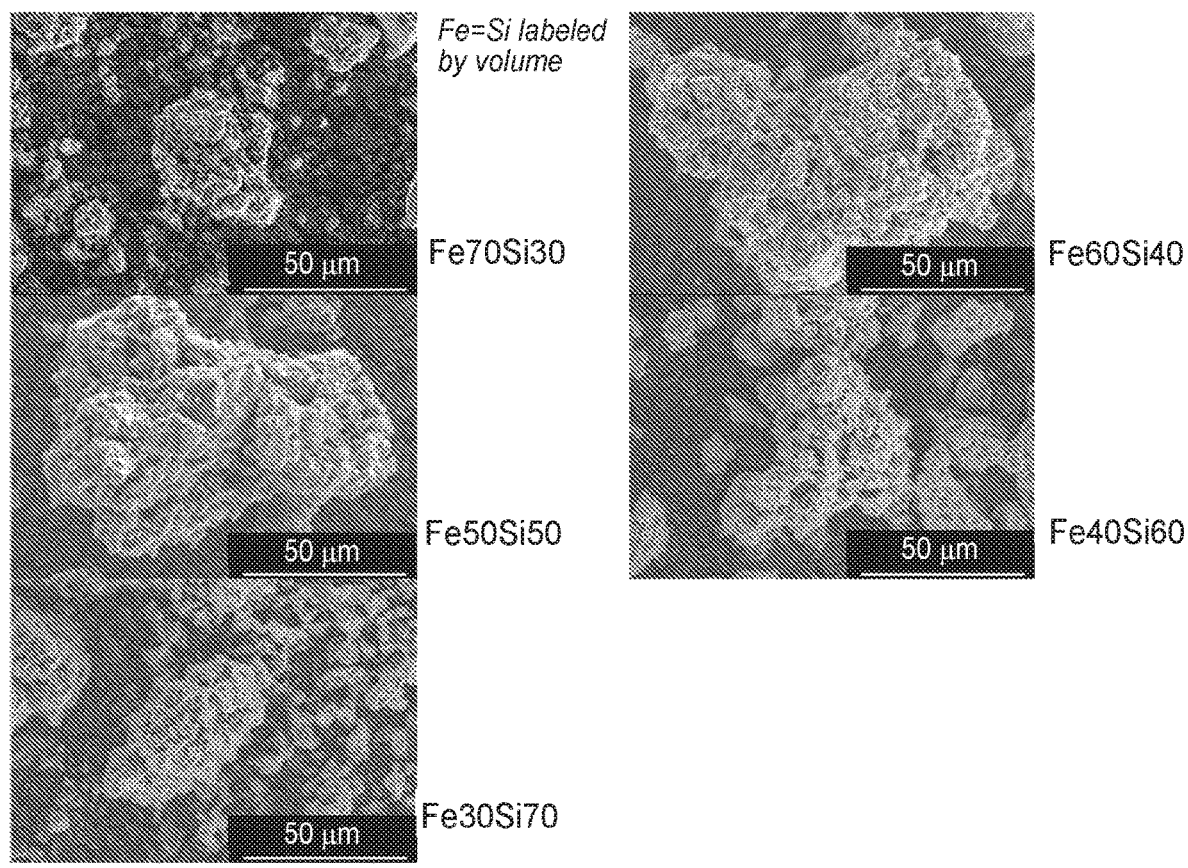
FIG. 1 shows Scanning Electron Microscope images of the sample delithiated Si—Fe alloys of Examples 1-5.

Silicon (Si) based alloys are a promising alternative to graphite as anode materials for next generation high energy density lithium ion batteries due, at least in part, to their higher energy density. However, relative to graphite, Si-based alloys are known to exhibit higher irreversible capacity, lower rate capabilities, and lower capacity retention with cycling. These deficiencies are believed to be due, at least in part, to expansion and contraction of the materials during cycling, which leads to parasitic reactions and mechanical degradation.

As used herein, the terms "charge" and "charging" refer to a process for providing electrochemical energy to a cell;

the terms "discharge" and "discharging" refer to a process for removing electrochemical energy from a cell, e.g., when using the cell to perform desired work;

the phrase "charge/discharge cycle" refers to a cycle wherein an electrochemical cell is fully charged, i.e. the cell attains it's upper cutoff voltage and the cathode is at about 100% state of charge, and is subsequently discharged to attain a lower cutoff voltage and the cathode is at about 100% depth of discharge;

the phrase "positive electrode" refers to an electrode (often called a cathode) where electrochemical reduction and lithiation occurs during a discharging process in a cell the phrase "negative electrode" refers to an electrode (often called an anode) where electrochemical oxidation and delithiation occurs during a discharging process in a cell;

the term "alloy" refers to a substance that includes chemical bonding between any or all of metals, metalloids, or semimetals;

the phrase "electrochemically active material" refers to a material, which can include a single phase or a plurality of phases, that can electrochemically react or form an alloy with lithium under conditions possibly encountered during charging and discharging in a lithium ion battery (e.g., voltages between 0 V and 2 V versus lithium metal);

the phrase "electrochemically inactive material" refers to a material, which can include a single phase or a plurality of phases, that does not electrochemically react or alloy with lithium under conditions possibly encountered during charging and discharging in a lithium ion battery (e.g., voltages between 0 V and 2 V versus lithium metal);

the phrases "electrochemically active phase" or "active phase" refer to a phase of an electrochemically active material that can electrochemically react or alloy with lithium under conditions possibly encountered during charging and discharging in a lithium ion battery (e.g., voltages between 0 V and 2 V versus lithium metal);

the phrases "electrochemically inactive phase" or "inactive phase" refer to phases of an electrochemically active material that does not electrochemically react or alloy with lithium under conditions possibly encountered during charging and discharging in a lithium ion battery (e.g., voltages between 0 V and 2 V versus lithium metal);

the phrases "electrochemically active chemical element" or "active chemical element" refer to chemical elements that can electrochemically react or alloy with lithium under conditions possibly encountered during charging and discharging in a lithium ion battery (e.g., voltages between 0 V and 2 V versus lithium metal); and the phrase "substantially homogeneous" refers to a material in which the components or domains of the material are sufficiently mixed with one another such that the make-up of one portion of the material is the same as that of any other portion of the material on a length scale of 50 nanometers or more.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Generally, the present disclosure is directed to a class of silicon alloy materials, which are electrochemically active, and that exhibit reduced expansion and contraction during cycling in an electrochemical cell. In some embodiments, the electrochemically active material of the present disclosure includes (i) silicon (Si); and (ii) carbon (C), one or more transition metal elements, or combinations thereof; and includes reduced amounts of silicide(s) (e.g., a stoichiometric Si-transition metal phase) and carbides (e.g. Si—C).

In some embodiments, the electrochemically active material may include either or both of carbon and one or more transition metal elements. In some embodiments, suitable transition metal elements may include Ti, V, Cr, Mn, Fe, Co, Ni, Cu, Y, Zr, Nb, Mo, Ta, W; especially those selected from Ti, Cr, Mn, Fe or Co. In some embodiments, the electrochemically active material may include carbon, and may not include a transition metal element. In other embodiments, the electrochemically active material may include one or more transition metal elements, and may not include carbon.

In some embodiments, the electrochemically active material may include silicon in an amount of between 10 and 30 mole %, 30 and 60 mole %, or 60 and 90 mole %, based on the total number of moles of all chemical elements present in the electrochemically active material. In various embodiments, any portion (up to all) of the silicon may be in the form of elemental silicon. In some embodiments, the electrochemically active material may include elemental silicon in an amount of between 10 and 30 mole %, 30 and 60 mole %, or 60 and 90 mole %, based on the total number of moles of all chemical elements present in the electrochemically active material.

In some embodiments, the electrochemically active material may include may include one or more transition metal elements in an amount between 10 and 30 mole %, 30 and 60 mole %, or 60 and 90 mole %, based on the total number of moles of all chemical elements present in the electrochemically active material; and/or may include carbon in an amount of between 10 and 30 mole %, 30 and 60 mole %, or 60 and 90 mole %, based on the total number of moles of carbon present and the total number of moles of all elements present in the electrochemically active material.

In some embodiments, as will be discussed in further detail below, as a result of the synthesis methods of the present disclosure, the electrochemically active material of the may contain a transition metal, but be substantially free of silicides such as, for example, a transition metal silicide and/or may contain carbon, but be substantially free of silicon carbides. In this regard, a substantial portion of the transition metal present in the electrochemically active material may be present in the elemental form. For example, in some embodiments, the amount of transition metal present in its elemental form may be greater than 50 mole %, greater than 60 mole %, greater than 80 mole %, greater than 95 mole %, or greater than 99 mole %, based on the total number of moles of all transition metal elements present in the electrochemically active material. In some embodiments, the amount of transition metal present in silicide phases may be present in the electrochemically active material in an amount of less than 15 mole %, less than 10 mole %, less than 5 mole %, less than 2 mole %, or less than 1 mole %, based on the total number of moles of transition metal elements present in the electrochemically active material. In some embodiments, a substantial portion of the carbon present in the electrochemically active alloy may be present in the elemental form. For example, in some embodiments, the amount of carbon present in its elemental form may be greater than 50 mole %, greater than 60 mole %, greater than 80 mole %, greater than 95 mole %, or greater than 99 mole %, based on the total number of moles of all carbon present in the electrochemically active material. In some embodiments, the amount of carbon present in carbide phases may be present in the electrochemically active material in an amount of less than 15%, less than 10%, less than 5%, less than 2%, or less than 1%, based on the total number of moles of carbon present in the electrochemically active material. In conventional silicon alloy active materials, a substantial portion (between 60 and 100%, or between 70% and 90%) of the transitional metal elements would react with silicon to form silicides. In a similar way, in conventional silicon alloy active materials, a substantial portion (between 60 and 100%, or between 70% and 90%) of carbon would react with silicon to form carbides.

In some embodiments, the amount of transition metal elements or carbon that is collectively present in silicide and carbide phases in the electrochemically active material may be less than 15%, less than 10 mole %, less than 5 mole %, less than 2 mole %, or less than 1 mole %, based on the total number of moles of carbon or transition metal elements present in the electrochemically active material.

It is believed that the absence of silicides and/or carbides allow a greater proportion of the silicon in the alloy to be active, while maintaining an electrochemically inactive phase which is metallic and dilutes the volume expansion of silicon, which improves cyclability. Furthermore, in the case of a substantially homogeneous Si—C alloy, which is substantially free of silicon carbide, both the silicon and the carbon will be electrochemically active. A Si—C alloy where both silicon and carbon are active will have reduced volume expansion compared to pure silicon, leading to better cyclability, and higher volumetric capacity than pure carbon, leading to a material enabling higher energy cells. Furthermore, in the case of a substantially homogeneous Si-transition metal alloy, in which greater than 50% of the transition metal is in its elemental state, the transition metal present in its elemental state will provide an electronically conductive inactive phase. In some embodiments, as will be discussed in further detail below, as a result of the synthesis methods of the present disclosure, the electrochemically active material (e.g., in the form of particles) may bear on an exterior surface thereof a layer or coating of a alkali metal decomposition product that at least partially surrounds the electrochemically active material. By "at least partially surrounds" it is meant that there is a common boundary between the coating and the exterior of the active material. For example, in embodiments in which lithium is removed from a lithiated silicon by exposure to a solvent that includes an alcohol, the electrochemically active material may bear on an exterior surface thereof a lithium carbonate coating. As will be understood by those skilled in the art, lithium carbonates generally form when a lithium containing substance at an electrochemical potential of less than about 1 V versus Li metal comes in contact with an oxygen containing organic solvent. It is to be appreciated that depending on the alkali metal or solvent employed, any number of alternative alkali metal decomposition products may be present in the coating.

In some embodiments, the electrochemically active material of the present disclosure may include one or more active phases that include silicon. The active phase may be in the form of or include an active chemical element (e.g., silicon), an active alloy, or combinations thereof. In addition to active phases that include silicon, the electrochemically active material may include active phases that include B, C, Mg, Al, Ca, Zn, Sr, Ag, Sn, Sb, Pb, or Bi; C, Al, or Sn; or C. In some embodiments, the active phases may further include one or more inactive chemical elements, such as Ti, V, Cr, Mn, Fe, Co, Ni, or Cu.

In some embodiments, active phases may account for at least 30 vol. % or at least 40 vol. % of the active material based on the total volume of the active material; or between 30 vol. % and 70 vol. %, between 40 vol. % and 60 vol. %, between 40 vol. % and 55 vol. %, between 40 vol. % and 42 vol. %, or between 50 vol. % and 52 vol. %, based on the total volume of the active material.

In some embodiments the electrochemically active material may further include an electrochemically inactive phase, such that the electrochemically active phase and the electrochemically inactive phase share at least one common phase boundary. In various embodiments, the electrochemically inactive phase may be in the form of or include one or more electrochemically inactive chemical elements, including transition metals (e.g., titanium, vanadium, chromium, manganese, iron, cobalt, nickel), alkaline earth metals, rare earth metals, or combinations thereof. In various embodiments, the electrochemically inactive phase may be in the form of an alloy. In various embodiments, the electrochemically inactive phase may include a transition metal or combination of transition metals. In various embodiments, the electrochemically inactive phase may be in a fully metallic (reduced state) and may include one or more transition metals. In various embodiments the electrochemically inactive phase may be free of silicon. In some embodiments, the electrochemically inactive phase may include one or more active chemical elements, including tin, carbon, gallium, indium, germanium, lead, antimony, bismuth, or combinations thereof. In some embodiments, the electrochemically inactive phase may include compounds such as aluminides, borides, nitrides, phosphates or stannides. The electrochemically inactive phase may include oxides, such as titanium oxide, zinc oxide, silicon oxide, aluminum oxide or sodium-aluminum oxide.

In some embodiments, inactive phase may account for between 30 vol. % and 70 vol. %, between 40 vol. % and 60 vol. %, or between 40 vol. % and 55 vol. % of the active material, based on the total volume of the active material.

In some embodiments, the electrochemically active material may not include an inactive phase.

In some embodiments, the electrochemically active material may take the form of particles. The particles may have a diameter (or length of longest dimension) that is no greater than 60 µm, no greater than 40 µm, no greater than 20 µm, no greater than 10 µm, no greater than 7 µm, or even smaller; at least 0.5 µm, at least 1 µm, at least 2 µm, at least 5 µm, or at least 10 µm or even larger; or 0.5 to 10 µm, 1 to 10 µm, 2 to 10 µm, 40 to 60 µm, 1 to 40 µm, 2 to 40 µm, 10 to 40 µm, 5 to 20 µm, 10 to 20 µm, 1 to 30 µm, 1 to 20 µm, 1 to 10 µm, 0.5 to 30 µm, 0.5 to 20 µm, or 0.5 to 10 µm.

In some embodiments the electrochemically active material may take the form of particles having low surface area. The particles may have a surface area that is less than 20 m$^2$/g, less than 12 m$^2$/g, less than 10 m$^2$/g, less than 5 m$^2$/g, less than 4 m$^2$/g, or even less than 2 m$^2$/g.

In some embodiments, each of the phases of the electrochemically active material (i.e., the active phase, inactive phase, or any other phase of the active material) may include or be in the form of one or more grains. In some embodiments, the Scherrer grain size of each of the phases of the electrochemically active material is no greater than 50 nanometers, no greater than 20 nanometers, no greater than 15 nanometers, no greater than 10 nanometers, or no greater than 5 nanometers. As used herein, the Scherrer grain size of a phase of an active material is determined, as is readily understood by those skilled in the art, by X-ray diffraction and the Scherrer equation.

In some embodiments, the phases of the electrochemically active material can be distributed substantially homogeneously throughout the active material, including the surface and bulk of the material.

In some embodiments, the electrochemically active material (e.g., in the form of particles) may bear on an exterior surface thereof a coating that at least partially surrounds the active material. By "at least partially surrounds" it is meant that there is a common boundary between the coating and the exterior of the active material. The coating can function as a chemically protective layer and can stabilize, physically and/or chemically, the components of the active material. Exemplary materials useful for coatings include, lithium carbonate, sodium carbonate, amorphous carbon, graphitic carbon, LiPON glass, phosphates such as lithium phosphate ($Li_3PO_4$), lithium metaphosphate ($LiPO_3$), lithium dithionate ($LiS_2O_4$), lithium fluoride (LiF), lithium metasilicate ($LiSiO_3$), and lithium orthosilicate ($Li_2SiO_4$). The coating can be applied by milling, solution deposition, vapor phase processes, or other processes known to those of ordinary skill in the art.

In some embodiments, the present disclosure relates to an electrochemically active material for use in an electrochemical cell (e.g., a lithium ion battery). For example, the electrochemically active material may be incorporated into a negative electrode for a lithium ion battery. However, it is to be appreciated that in accordance with some embodiments, the present disclosure describes the electrochemically active material at a point in time prior to incorporation of the electrochemically active material into an electrochemical cell (i.e., the material in a state in which it is to be incorporated into an electrochemical cell, and prior to being subjected to an initial charge/discharge cycle in the electrochemical cell). That is, in some embodiments, the materials described herein are to be distinguished from those materials that have previously been subjected to one or more charge/discharge cycles in an electrochemical cell.

In some embodiments, the present disclosure is further directed to negative electrode compositions for use in lithium ion batteries. The negative electrode compositions may include the above-described electrochemically active materials. Additionally, the negative electrode compositions may include one or more additives such as binders, conductive diluents, fillers, adhesion promoters, thickening agents for coating viscosity modification such as carboxymethylcellulose, polyacrylic acid, polyvinylidene fluoride, polyimide, lithium polyacrylate, carbon black, or other additives known by those skilled in the art.

In illustrative embodiments, the negative electrode compositions may include an electrically conductive diluent to facilitate electron transfer from the composition to a current collector. Electrically conductive diluents include, for example, carbons, powdered metal, metal nitrides, metal carbides, metal silicides, and metal borides, or combinations thereof. Representative electrically conductive carbon diluents include carbon blacks such as Super P and Super S carbon blacks (both from Timcal, Switzerland), Shawinigan Black (Chevron Chemical Co., Houston, Tex.), acetylene black, furnace black, lamp black, graphite, carbon fibers, carbon nanotubes, and combinations thereof. In some embodiments, the amount of conductive diluent in the electrode composition may be at least 2 wt. %, at least 6 wt. %, or at least 8 wt. %, or at least 20 wt. % based upon the total weight of the electrode coating; less than 5 wt. %, less than 2 wt. %, or less than 1 wt. % based upon the total weight of the electrode composition, or between 0.2 wt. % and 80 wt. %, between 0.5 wt. % and 50 wt. %, between 0.5 wt. % and 20 wt. %, or between 1 wt. % and 10 wt. %, based upon the total weight of the electrode composition.

In some embodiments, the negative electrode compositions may include graphite to improve the density and cycling performance, especially in calendered coatings, as described in U.S. Patent Application Publication 2008/0206641 by Christensen et al., which is herein incorporated by reference in its entirety. The graphite may be present in the negative electrode composition in an amount of greater than 10 wt. %, greater than 20 wt. %, greater than 50 wt. %, greater than 70 wt. % or even greater, based upon the total weight of the negative electrode composition; or between 20 wt. % and 90 wt. %, between 30 wt. % and 80 wt. %, between 40 wt. % and 60 wt. %, between 45 wt. % and 55 wt. %, between 80 wt. % and 90 wt. %, or between 85 wt. % and 90 wt. %, based upon the total weight of the electrode composition.

In some embodiments, the negative electrode compositions may also include a binder. Suitable binders include oxo-acids and their salts, such as sodium carboxymethylcellulose, polyacrylic acid, lithium polyacrylate, sodium polyacrylate, methyl acrylate/acrylic acid copolymers, lithium methyl acrylate/acrylate copolymers, and other optionally lithium or sodium neutralized polyacrylic acid copolymers. Other suitable binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Other suitable binders include polyimides such as the aromatic, aliphatic or cycloaliphatic polyimides, and polyacrylates. The binder may be crosslinked. In some embodiments, the amount of binder in the electrode composition may be at least 3 wt. %, at least 5 wt. %, at least 10 wt. %, or at least 20 wt. % based upon the total weight of the electrode coating; less than 30 wt. %, less than 20 wt. %, or less than 10 wt. %, based upon the total weight of the electrode composition; or between 3 wt. % and 30 wt. %, between 3 wt. % and 20 wt. %, or between 3 wt. % and 10 wt. %, based upon the total weight of the electrode composition.

In some embodiments, the present disclosure is further directed to negative electrodes for use in lithium ion electrochemical cells. The negative electrodes may include a current collector having disposed thereon the above-described negative electrode composition. The current collector may be formed of a conductive material such as a metal (e.g., copper, aluminum, nickel), or a carbon composite.

In some embodiments, the present disclosure further relates to lithium ion electrochemical cells. In addition to the above-described negative electrodes, the electrochemical cells may include a positive electrode, an electrolyte, and a separator. In the cell, the electrolyte may be in contact with both the positive electrode and the negative electrode, and the positive electrode and the negative electrode are not in physical contact with each other; typically, they are separated by a polymeric separator film sandwiched between the electrodes.

In some embodiments, the positive electrode may include a current collector having disposed thereon a positive electrode composition that includes a lithium transition metal oxide intercalation compound such as $LiCoO_2$, $LiCo_{0.2}Ni_{0.8}O_2$, $LiMn_2O_4$, $LiFePO_4$, $LiNiO_2$, or lithium mixed metal oxides of manganese, nickel, and cobalt in any proportion. Blends of these materials can also be used in positive electrode compositions. Other exemplary cathode materials are disclosed in U.S. Pat. No. 6,680,145 (Obrovac et al.) and include transition metal grains in combination with lithium-containing grains. Suitable transition metal grains include, for example, iron, cobalt, chromium, nickel, vanadium, manganese, copper, zinc, zirconium, molybdenum, niobium, or combinations thereof with a grain size no greater than about 50 nanometers.

In various embodiments, useful electrolyte compositions may be in the form of a liquid, solid, or gel. The electrolyte compositions may include a salt and a solvent (or charge-carrying medium). Examples of solid electrolyte solvents include polymers such as polyethylene oxide, polytetrafluoroethylene, fluorine-containing copolymers, and combinations thereof. Examples of liquid electrolyte solvents include ethylene carbonate (EC), diethyl carbonate (DEC), dimethyl carbonate (DMC), ethyl methyl carbonate (EMC), propylene carbonate, fluoroethylene carbonate (FEC), difluoroethylene carbonate (DFEC), tetrahydrofuran (THF), acetonitrile, and combinations thereof. In some embodiments the electrolyte solvent may comprise glymes, including monoglyme, diglyme and higher glymes, such as tetraglyme Examples of suitable lithium electrolyte salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof.

In some embodiments, the lithium ion electrochemical cells may further include a microporous separator, such as a microporous material available from Celgard LLC, Charlotte, N.C. The separator may be incorporated into the cell and used to prevent the contact of the negative electrode directly with the positive electrode. The separator blocks electronic conduction while being sufficiently porous to allow ionic flow via the electrolyte.

The present disclosure further relates to methods of making the above-described electrochemically active materials. In some embodiments, an alkali metaled silicon (e.g., lithiated silicon (or lithium-silicon alloy) or sodiated silicon (or sodium-silicon alloy)) may be formed by combining elemental silicon and the elemental form of an alkali metal (e.g., elemental lithium or elemental sodium). For example, the silicon and alkali metal may be melted together in stoichiometric ratios, or with excess alkali metal to compensate for alkali metal evaporation, in the presence of heat (e.g., in a furnace at a temperature greater than 180° C.). In some embodiments, the resulting alkali metaled silicon may be in the form of a crystalline material (e.g. $Li_{12}S_{17}$, $Li_7Si_3$, $Li_{13}Si_4$, $Li_{15}Si_4$, $Li_{21}Si_5$). For convenience, only embodiments with lithiated silicon will be hereafter described, but it is to be appreciated that any other alkali metaled silicon could be employed without deviating from the scope of the present disclosure.

In some embodiments, the lithiated silicon may then be alloyed with either or both of carbon and one or more transition metal elements. The carbon may be introduced in the form of graphite, soft carbon, hard carbon, or carbon black. The transition metals may be introduced in their elemental forms or in an alloyed metallic form. Alloying may be carried out using conventional methods such as ball milling, reactive sputtering, or meltspinning.

In some embodiments, the electrochemically active materials of the present disclosure may then be formed by delithiating the lithiated alloy (i.e., removing the lithium from the lithium containing alloy). Delithiating the lithiated alloy may include exposing (e.g., washing, submerging) the lithiated alloy to a solvent capable of oxidizing lithium at a controlled rate. Suitable solvents may include alcohols, such as ethanol and isopropanol; nitriles, such as acetonitrile; amides, such as N-methylpyrrolidinone; amines, such as propylamine; ketones, such as acetone or methyl ethyl ketone; organic acids, such as formic acid; aldehydes, such as butyraldehyde, or combinations thereof. Solvents such as water are possible, though not preferred as the delithiation may occur too violently. In embodiments, between 95 and 100 atomic %, of the lithium is removed from within the lithiated alloy material. After the lithium has been removed from within the lithiated alloy material, some lithium may remain, for example, in the form of a carbonate that may coat the exterior of the lithiated alloy material in an amount up to 10% by weight.

The present disclosure further relates to methods of making negative electrodes that include the above-described electrochemically active materials. In some embodiments, the method may include mixing the above-described electrochemically active materials, along with any additives such as binders, conductive diluents, fillers, adhesion promoters, thickening agents for coating viscosity modification and other additives known by those skilled in the art, in a suitable coating solvent such as water or N-methylpyrrolidinone to form a coating dispersion or coating mixture. The dispersion may be mixed thoroughly and then applied to a foil current collector by any appropriate coating technique such as knife coating, notched bar coating, dip coating, spray coating, electrospray coating, or gravure coating. The current collectors may be thin foils of conductive metals such as, for example, copper, aluminum, stainless steel, or nickel foil. The slurry may be coated onto the current collector foil and then allowed to dry in air or vacuum, and optionally by drying in a heated oven, typically at about 80° to about 300° C. for about an hour to remove the solvent.

The present disclosure further relates to methods of making lithium ion electrochemical cells. In various embodiments, the method may include providing a negative electrode as described above, providing a positive electrode that includes lithium, and incorporating the negative electrode and the positive electrode into an electrochemical cell comprising a lithium-containing electrolyte.

The disclosed lithium ion electrochemical cells can be used in a variety of devices including, without limitation, portable computers, tablet displays, personal digital assistants, mobile telephones, motorized devices (e.g., personal or household appliances and vehicles), instruments, illumination devices (e.g., flashlights) and heating devices. One or more lithium ion electrochemical cells of this disclosure can be combined to provide a battery pack.

In accordance with the compositions and methods of the present disclosure, electrochemically active particles having improved cycle performance and decreased mechanical degradation may be obtained. In some embodiments, lithium-ion electrochemical cells that incorporate the negative electrodes of the present disclosure may exhibit a capacity retention at cycle 50, 100, or 500 of better than 90%, better than 95%, better than 98%, or even better than 99%.

LISTING OF EMBODIMENTS

1. An electrochemically active material comprising:
   (i) elemental silicon; and
   (ii) a transition metal;
   wherein at least 50 mole % of the transition metal is present in its elemental state, based on the total number of moles of transition metal elements present in the electrochemically active material.
2. The electrochemically active material according to embodiment 1, further comprising carbon, wherein at least 50 mole % of the carbon is present in its elemental state, based on the total number of moles of carbon present in the electrochemically active material.
3. The electrochemically active material according to embodiment 1, wherein the electrochemically active material does not comprise carbon.

4. The electrochemically active material according to any one of embodiments 1-3, wherein the one or more transition metal elements comprise iron.

5. An electrochemically active material comprising:
   (i) elemental silicon;
   (ii) carbon; and
   wherein at least 50 mole % of the carbon is present in its elemental state, based on the total number of moles of carbon present in the electrochemically active material; and
   wherein prior to incorporation of the electrochemically active material into an electrochemical cell, the electrochemically active material bears on an exterior surface thereof a coating that comprises an alkali metal decomposition product.

6. The electrochemically active material according to embodiment 5, wherein the alkali metal decomposition product comprises lithium carbonate.

7. The electrochemically active material according to embodiment 6, wherein the electrochemically active material further comprises a transition metal.

8. The electrochemically active material according to any one of embodiments 1-7, wherein the silicon is present in the electrochemically active material in an amount of between 10 mole % and 90 mole %, based on the total number of moles of all chemical elements present in the electrochemically active material.

9. The electrochemically active material according to any one of the previous embodiments, wherein transition metal elements are present in the electrochemically active material in an amount of between 10 mole % and 90 mole %, based on the total number of moles of all chemical elements present in the electrochemically active material.

10. The electrochemically active material according to any one of embodiments 3 and 5-9, wherein carbon is present in the electrochemically active material in an amount of between 10 mole % and 90 mole %, based on the total number of moles of all chemical elements present in the electrochemically active material.

11. The electrochemically active material according to any one of the preceding embodiments, wherein any electrochemically active or electrochemically inactive phases present in the electrochemically active material are be distributed substantially homogeneously throughout the electrochemically active material.

12. The electrochemically active material according to any one of the preceding embodiments, wherein the Scherrer grain size of each phase of the electrochemically active material is 50 nanometers or less.

13. The electrochemically active material according to any one of the preceding embodiments, wherein the electrochemically active material comprises a silicon alloy material.

14. An electrode composition comprising:
   the electrochemically active material according to any one of embodiments 1-13; and
   a binder.

15. An electrode composition according to embodiment 14, further comprising graphite.

16. A negative electrode comprising:
   the electrode composition according to any one of embodiments 14-15; and
   a current collector.

17. An electrochemical cell comprising:
   the negative electrode of embodiment 16;
   a positive electrode comprising a positive electrode composition comprising lithium; and
   an electrolyte comprising lithium.

18. An electronic device comprising the electrochemical cell according to embodiment 17.

19. A method of making an electrochemical cell, the method comprising:
   providing a positive electrode comprising a positive electrode composition comprising lithium;
   providing a negative electrode according to embodiment 16;
   providing an electrolyte comprising lithium; and
   incorporating the positive electrode, negative electrode, and the electrolyte into an electrochemical cell.

20. A method of making an electrochemically active material, the method comprising:
   alloying a lithium-silicon alloy with either or both of carbon and one or more transition metal elements to form a lithium-containing alloy; and
   removing lithium from the lithium-containing alloy.

21. The method according to embodiment 20, wherein removing the lithium from the lithium-containing alloy comprises exposing the lithium-containing alloy to an alcohol.

The operation of the present disclosure will be further described with regard to the following detailed examples. These examples are offered to further illustrate various specific embodiments and techniques. It should be understood, however, that many variations and modifications may be made while remaining within the scope of the present disclosure.

EXAMPLES

Test Methods and Preparation Procedures

The following test methods and protocols were employed in the evaluation of the illustrative and comparative examples that follow.

Characterization by Microscopy, X-ray Diffraction (XRD), Mössbauer Spectroscopy

Particle morphology was studied using a PHENOM G2-PRO Scanning Electron Microscope (Nanoscience, Arizona) and a Hitachi S-4700 FEG Scanning Electron Microscope (Hitachi High-Technologies Corporation, Japan).

XRD measurement was conducted using an ULTIMA IV X-RAY DIFFRACTOMETER, available from Rigaku Americas Corporation, The Woodlands, Tex., equipped with a Cu anode X-ray tube, and a scintillation detector with a diffracted beam monochromator. XRD data was collected between $2\theta=20°\sim80°$ with a step of $0.05°$ and a 6 second dwell time.

Room temperature $^{57}$Fe Mössbauer spectra were measured using a See Co. constant acceleration spectrometer equipped with a Rh$^{57}$Co source. The velocity scale calibration was determined relative to α-Fe at room temperature.

Surface Analysis

The sample surfaces were examined using X-ray Photoelectron Spectroscopy (XPS) also known as Electron Spectroscopy for Chemical Analysis (ESCA).

XPS Analysis Conditions

| Instrument | Kratos Axis Ultra ™ |
| --- | --- |
| analysis areas | ~300 μm × 700 μm |
| photoelectron take off angle | 90° (normal emission) ± 10° solid angle of acceptance |
| x-ray source | Monochromatic Al Kα (1486.6 eV) 140 W |
| charge neutralization | Low energy e− flood source |
| charge correction | C1s C—C, H component -> 284.8 eV |
| analysis chamber pressure | ~5 × 10⁻⁸ Torr |

Coin Cell Preparation 2325 type coin cells were assembled to evaluate electrochemical performance of materials of the current invention in sodium cells. The active electrode included 62.5% by weight (wt %) of the exemplary delithiated silicon alloys described below, 18 wt % Super C65 carbon black (TimCal, Switzerland), and 19.5 wt % polyimide (PI) (PI-2555, HD Microsystems, Parlin, N.J.) in the weight ratios indicated. These components were thoroughly mixed in N-methyl-2-pyrrolidone (anhydrous 99.5%, Sigma Aldrich Corporation, St. Louis, Mo.) with four 7/16" tungsten carbide balls in a Retsch PM200 rotary mill, available from Retsch GmbH, Haan, Germany. Milling was conducted at 100 rpm for 1 hour to create uniform slurry. The slurry was then coated onto copper foil and dried under vacuum at 120° C. for 2 hours. Circular electrodes, 2 cm², were punched from the resulting coated copper foil. Coin cell preparation was carried out in an argon filled glove box. Lithium foil disk anodes were punched from 0.015 inch (0.38 mm) thick foil (99.9%, Aldrich). The electrolyte was 1 M $LiPF_6$ (BASF) dissolved in a 10/30/60 by volume solution monofluoroethylene carbonate, ethylene carbonate and diethyl carbonate (all from BASF). Two Celgard 3501 separators, available from Celgard, LLC, Charlotte, N.C., were used as separators.

Constant Current Cycling Test Method

Constant current cycling of a cell was conducted on a SERIES 4000 AUTOMATED TEST SYSTEM, available from Maccor, Inc., Tulsa, Okla. Cells were cycled between 5 mV and 900 mV at a C/20 rate and trickle discharged (lithiation of the alloy) to a rate of C/40 on the first cycle; and cycled at a rate of C/5 and trickle discharged to a C/20 rate for subsequent cycles. The C-rate of each alloy was calculated based on a capacity of 3578 mAh/g for the Si content in of the alloy and 370 mAh/g for the carbon content of the alloy.

Determination of the Coating Volume Expansion

The coating volume expansion was determined as the percent increase in coating thickness before assembling cells and after recovering the electrode, in an argon-filled glovebox, from a cell that has undergone one full discharge. Electrode thicknesses were measured in an argon-filled glove box to within ±1 μm with a Mitutoyo 293-340 precision micrometer. The coating thickness was determined as the measured electrode thickness minus the current collector thickness.

Delithiated Silicon-Transition Metal Alloys

The crystalline phase $Li_{12}Si_7$ was synthesized by melting Si and Li together in stoichiometric ratios under a purging argon atmosphere in an arc furnace. It was then milled with Fe powder (−325 mesh, 99.9%, Aldrich) in the amounts and Si:Fe mole ratios listed in Table 1, using a Spex Mill, for 2 hours, with 115 g of 3/16" stainless steel balls.

Delithiation was performed by placing the $Li_{12}Si_7$ in ethanol (EtOH) solvent, under flowing argon at room temperature overnight. The solution was then filtered using a Buchner funnel and washed with ethanol and then water until the pH of the supernatant solution was approximately 7. The resulting powder was then heated in a tube furnace at 120° C. under flowing argon for 1 hour.

TABLE 1

| EXAMPLE | Fe:Si STOICHIOMETRIC RATIO | Fe:Si VOLUME RATIO | Fe (g) | $Li_{12}Si_7$ (g) |
| --- | --- | --- | --- | --- |
| 1 | 42:58 | 70:30 | 1.3127 | 1.2926 |
| 2 | 53:47 | 60:40 | 1.8686 | 1.1829 |
| 3 | 63:37 | 50:50 | 2.5051 | 1.0572 |
| 4 | 72:28 | 40:60 | 3.2411 | 0.9119 |
| 5 | 80:20 | 30:70 | 4.1020 | 0.7419 |

Figure 2:
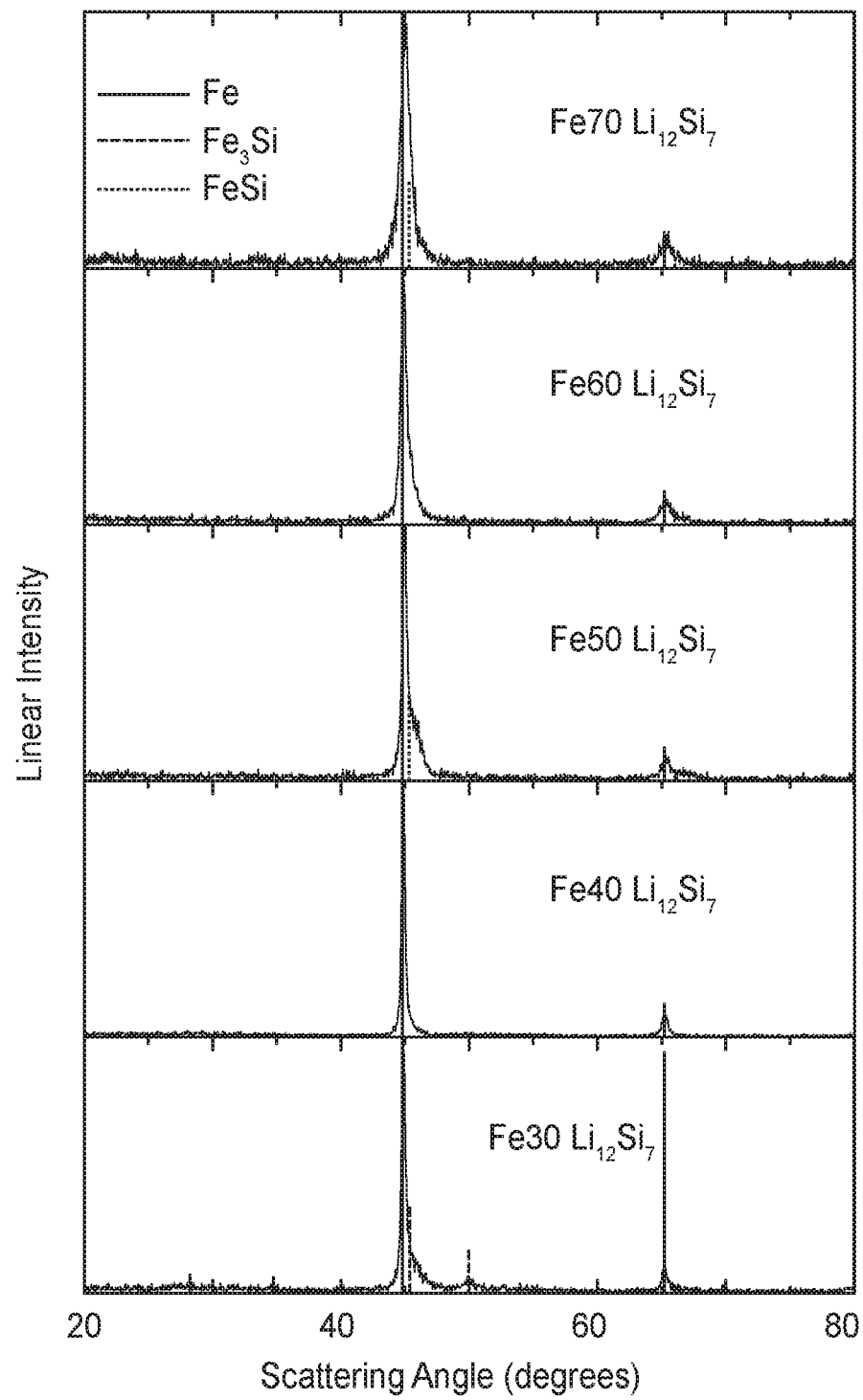
FIG. 2 shows X-ray diffraction patterns of the sample delithiated Si—Fe alloys of Examples 1-5.

SEM images of the Si—Fe alloys after delithiation are provided in FIG. 1. FIG. 2 shows the XRD patterns of the Examples 1-5 after delithiation. The patterns show the presence of metallic Fe. The minimal presence or absence of iron silicides is notable. The narrowest peak observed in the XRD patterns corresponded to Fe metal with a grain size of 18 nm. All other phases having grain sizes that were smaller than this.

The delithiated alloys of Examples 1-5 were characterized as negative electrode materials in Li-ion coin half cells prepared as discussed previously using 62.5 wt % of each Si:Fe alloy, 18 wt % Super C carbon black, and 19.5 wt % PI. Table 2 summarizes the capacity, retention and volume expansion of electrode coatings utilizing the delithiated alloys of Examples 1-5. The exemplary Fe—Si alloys of Examples 1-5 demonstrate good capacity retention and low expansion.

TABLE 2

| Ex. | FIRST DISCHARGE (mAh/g) | FIRST CHARGE (mAh/g) | $50^{TH}$ DISCHARGE (mAh/g) | RETENTION (%) | COATING EXPANSION (%) |
| --- | --- | --- | --- | --- | --- |
| 1 | 398.8 | 67.8 | 47.1 | 70 | 5 |
| 2 | 492.8 | 260.5 | 229.9 | 88 | 50 |
| 3 | 772.3 | 489.3 | 446.5 | 91 | 84 |
| 4 | 1011.1 | 702.4 | 527.1 | 75 | 111 |
| 5 | 1215.3 | 906.4 | 388.1 | 43 | 128 |

Figure 3:
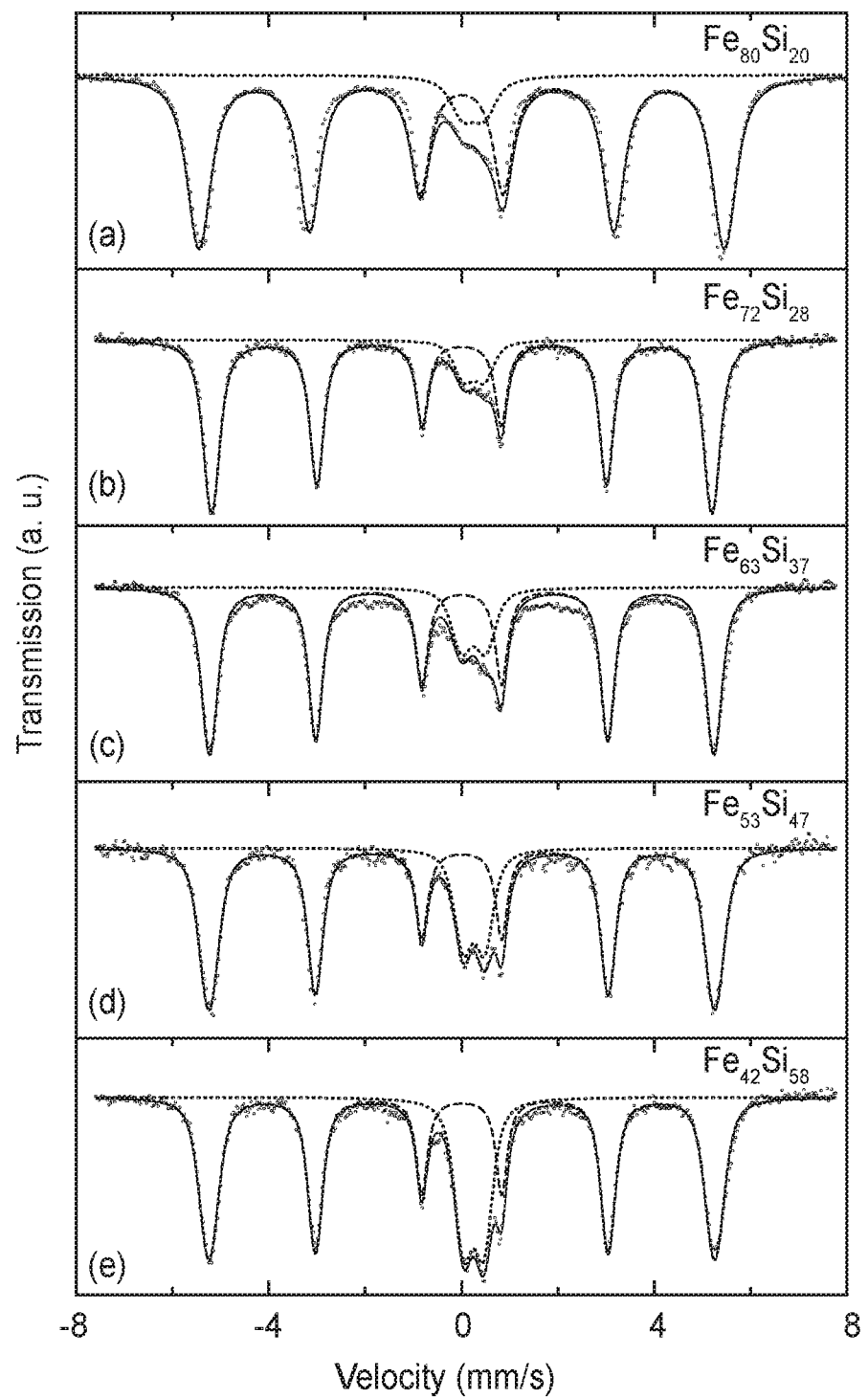
FIG. 3 shows room temperature $^{57}$Fe Mössbauer effect spectra of sample delithiated Si—C alloys of Examples 6-11.

Mössbauer spectra of the Fe—Si alloys of Examples 1-5 are shown in FIG. 3. All spectra were fit using a combination of two distinct Fe sites. The hyperfine parameters obtained from the analysis of spectra are listed in Table 3, including center shifts (δ), magnetic fields (H), quadrupole splitting (Δ), half width at half maximum (HWHM), and site populations (A). There are one sextet and one doublet components with center shifts near 0 mm/s and +0.25 mm/s, respectively, in the Mössbauer spectra of all Fe—Si samples. The magnetically split sextet in all spectra shows a hyperfine field of ~33.0 T and a center shift near 0 mm/s, indicative of α-Fe phase in the Fe—Si alloys. As shown in Table 6, the hyperfine field (H) is almost same for all samples, indicative of similar Fe—Fe ferromagnetic coupling. The doublet can be associated with the FeSi phase [108-111]. The Mössbauer spectra suggest that all the Fe—Si alloys of Examples 1-5 are composed of Fe and FeSi. The percent area of the sextet indicates the atomic percent of Fe based on the total number of moles of Fe present in the Fe—Si alloy that is in the elemental Fe phase and the percent area of the doublet indicates the atomic percent of Fe based on the total number of moles of Fe present in the Fe—Si alloy that is in the FeSi phase. From these values the atomic percent of Fe based on the total number of moles of Fe in the Fe—Si alloys that is present in its elemental state was determined and was found to be greater than 70 atomic % in all instances for the Examples 1-5 listed in Table 3.

TABLE 3

| EXAMPLE | Fe:Si MOLAR RATIO | Fe AREA, % | FeSi AREA, % | MOLE % OF Fe IN ITS ELEMENTAL STATE |
|---|---|---|---|---|
| 1 | $Fe_{42}Si_{58}$ | 71.6 | 28.4 | 71.6 |
| 2 | $Fe_{53}Si_{47}$ | 79.0 | 21.0 | 79.0 |
| 3 | $Fe_{63}Si_{37}$ | 84.9 | 13.1 | 84.9 |
| 4 | $Fe_{72}Si_{28}$ | 89.4 | 10.6 | 89.4 |
| 5 | $Fe_{80}Si_{20}$ | 90.3 | 9.7 | 90.3 |

Delithiated Silicon-Carbon Alloys

Si—C samples were prepared from the delithiation of Li—Si—C alloys, as described above for the Si—Fe material, except that graphite (Hitachi, MAG-E) was used instead of Fe powder. Table 4 lists the stoichiometric ratios of Si and C in each example and the mass of $Li_{12}Si_7$ and graphite used to prepare each sample.

TABLE 4

| EXAMPLE | SI: C MOLE FRACTION | $Li_{12}Si_7$ (g) | GRAPHITE (g) |
|---|---|---|---|
| 6 | 10:90 | 0.5433 | 1.4688 |
| 7 | 20:80 | 0.8503 | 1.0217 |
| 8 | 30:70 | 1.0476 | 0.7343 |
| 9 | 40:60 | 1.1851 | 0.5340 |
| 10 | 50:50 | 1.2865 | 0.3864 |
| 11 | 60:40 | 1.3642 | 0.2732 |

Figure 4:
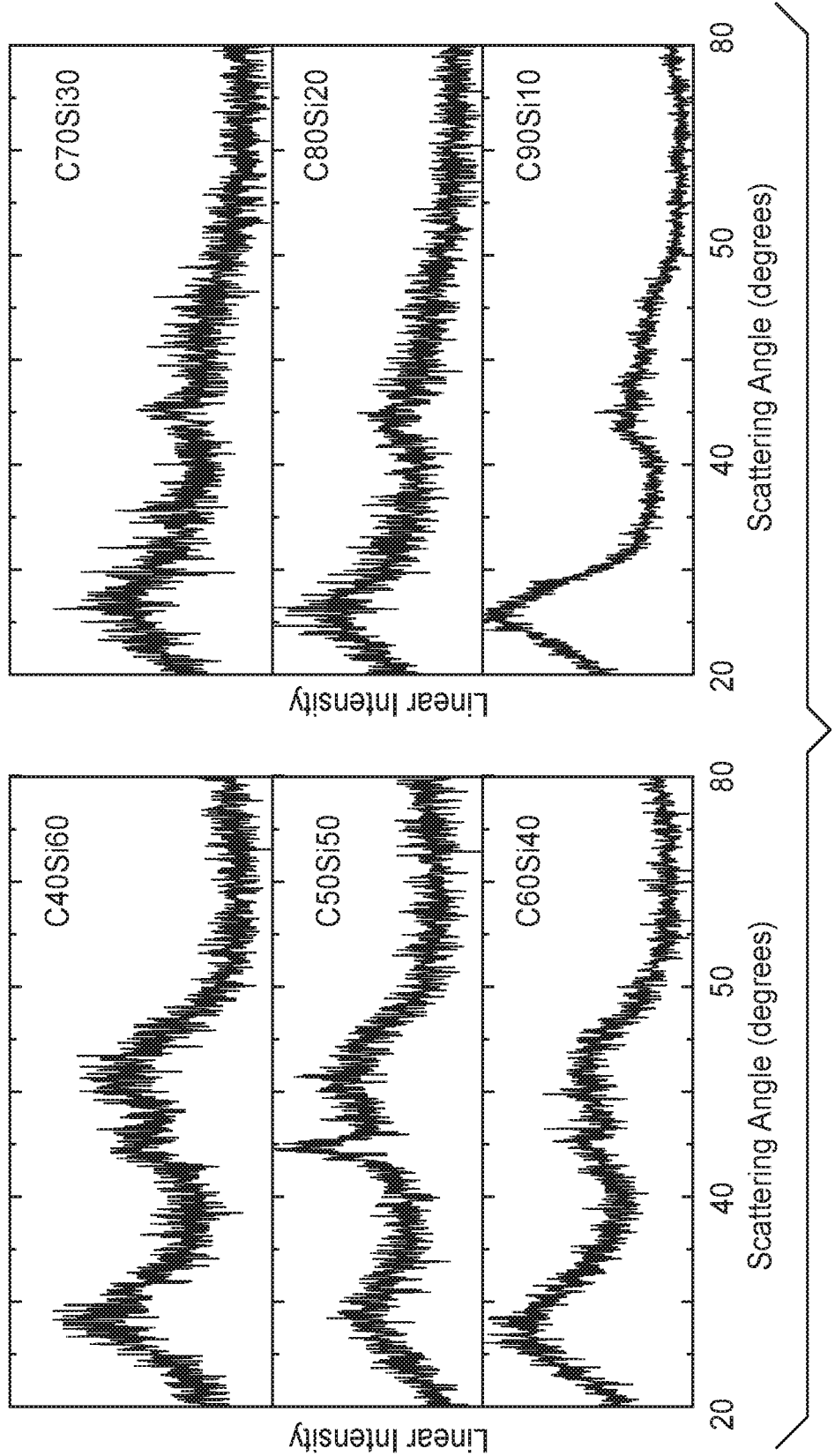
FIG. 4 shows X-ray diffraction patterns of samples of Examples 6-11.
Figure 5:
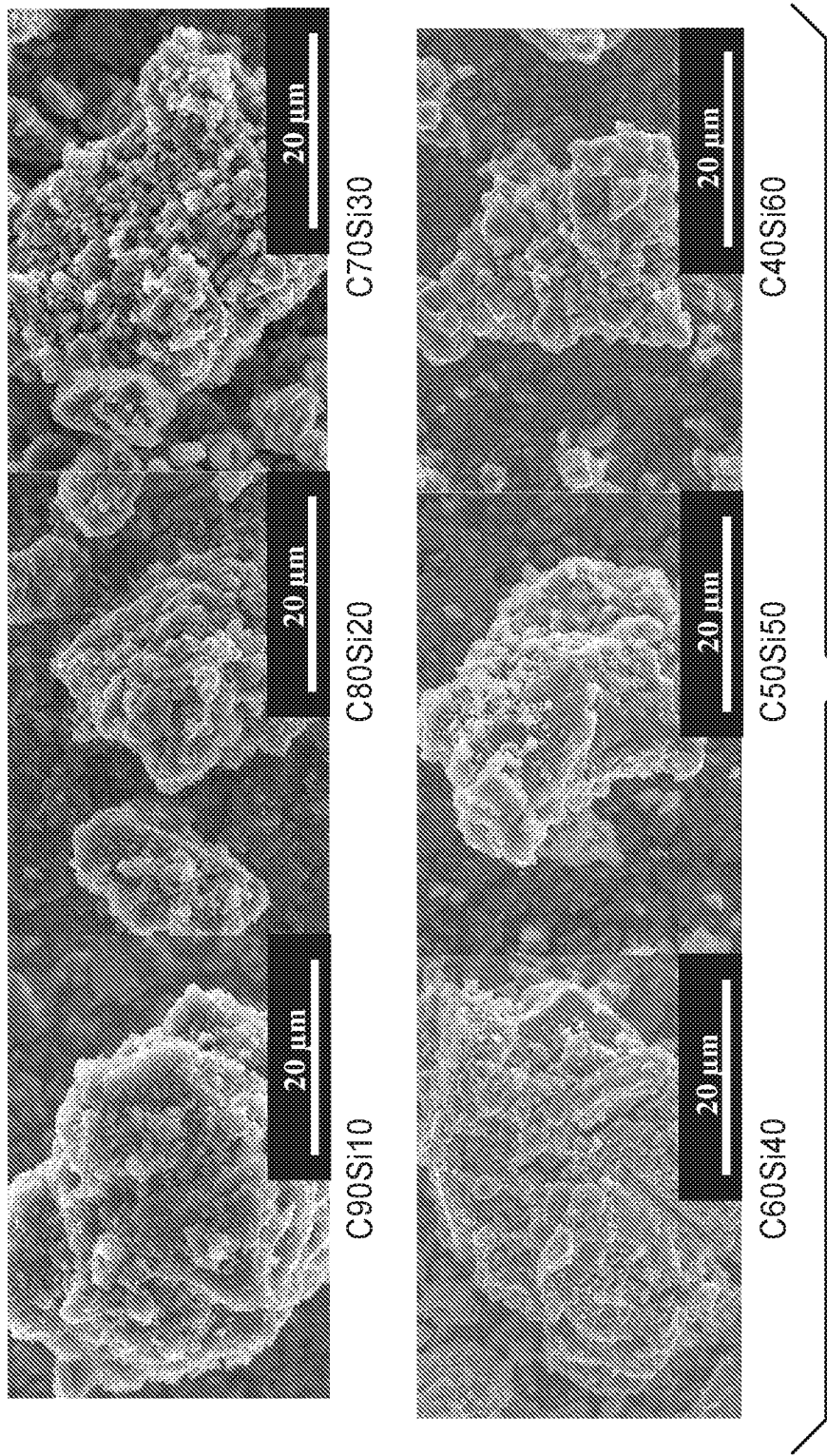
FIG. 5 shows Scanning Electron Microscope images samples of Examples 6-11.

FIG. 4 shows the XRD patterns of the delithiated Si—C alloys. The broad peaks indicate that they are amorphous or nanocrystalline, and do not comprise any phase with a grain size greater than 10 nm. The absence of detectable silicon carbide is notable. FIG. 5 shows SEM micrographs of particles of Examples 6-11 after delithiation.

Figure 6:
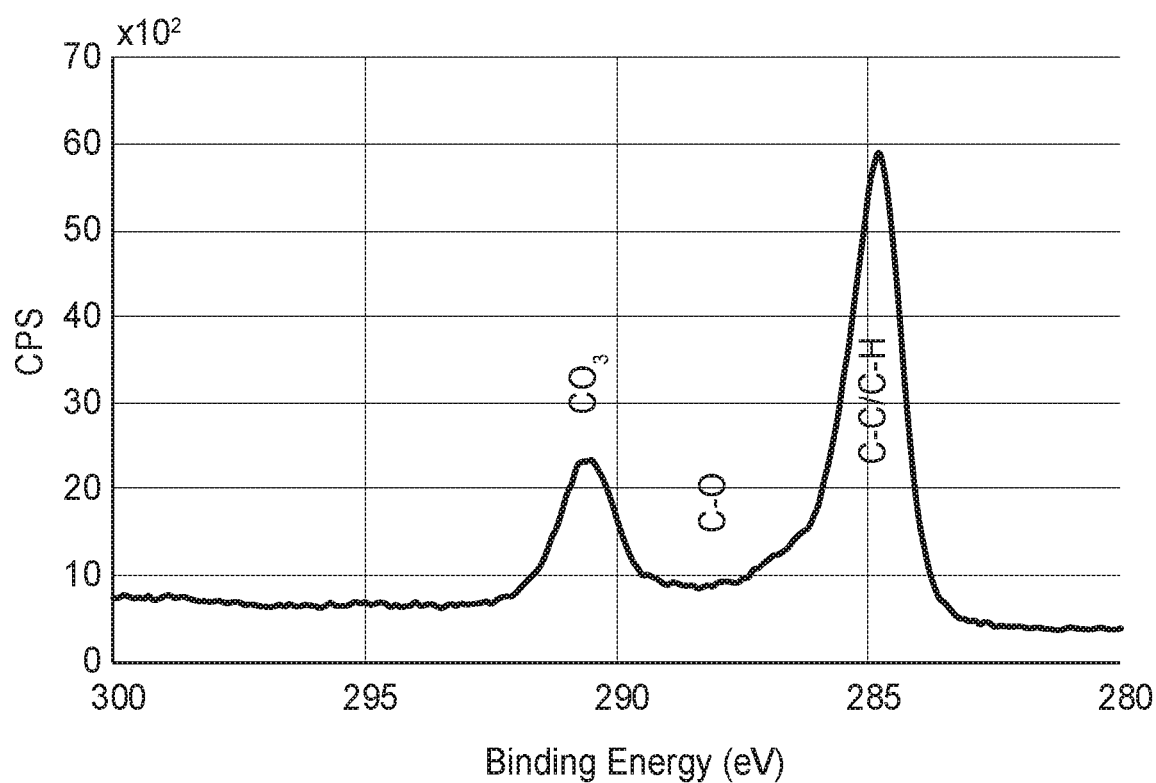
FIG. 6 shows an X-ray Photoelectron Spectroscopy (XPS) C is core peak spectrum of Example 9.

Results of XPS analysis are provided in FIGS. 6 and 7. FIG. 6 shows the C is core peak spectrum of Example 9. Two major peaks and a wide shoulder were detected in the C is spectrum. The first peak can be attributed to C—C/C—H and/or graphitic carbon at ~284.8 eV. The shoulder at ~286.8 eV can be attributed to C in C—O environment due to possible presence of C in R—$CH_2$—$OCO_2Li$ compound on the surface. The second peak at ~290.2 eV can be attributed to C atom in $CO_3$ (carbonate), which can be due to $Li_2CO_3$. Furthermore, the peak at 290.2 eV was more intense than the peak at 286.8 eV, consistent with $Li_2CO_3$ as the primary Li-containing compound on the surface. The contribution of SiC species (peak at ~283 eV) to surface species appeared to be negligible.

Figure 7A:
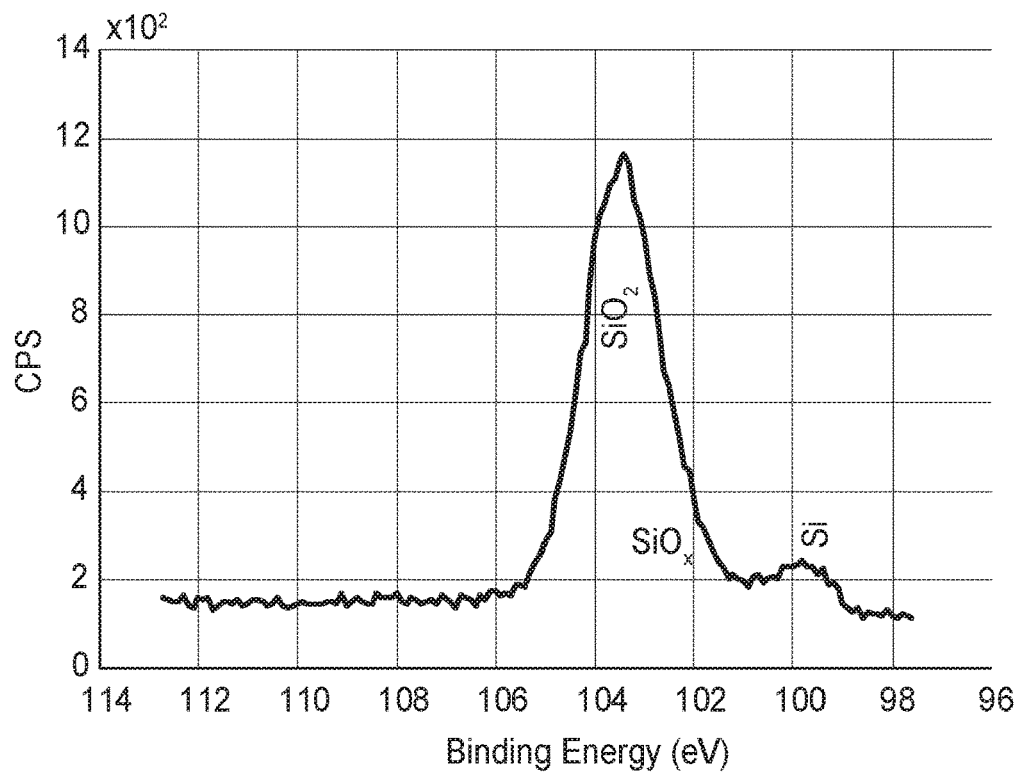
FIG. 7a shows an XPS spectrum of the Si 2p region of a sample of Example 9.
Figure 7B:
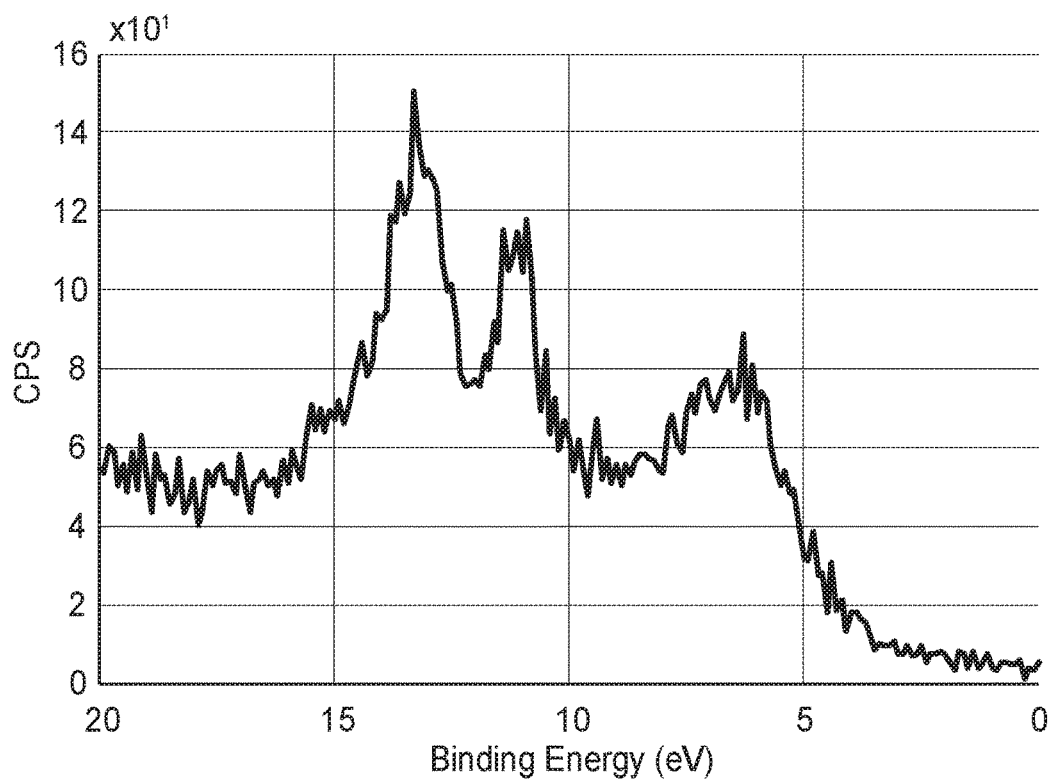
FIG. 7b shows an XPS valance spectrum of a sample of Example 9.

FIG. 7a shows an XPS spectrum of the Si 2p region for one area of Example 9. The Si 2p region had a peak at 100.0 eV and another wide peak at 103.5 eV. The former peak was due to reduced Si and the latter wide peak appeared to be due to presence of oxidized Si in various oxidization states on the surface. A valance spectrum of Example 9 is shown in FIG. 7b. The valance spectrum for Example 9 was consistent with reference valance spectra for the $Li_2CO_3$ compound on the surface as described in technical literature. ["Surface film formation on a graphite electrode in Li-ion batteries: AFM and XPS study," S. Leroy, et al., *Surface and Interface Analysis*, 2005; 37: 773-781.] This conclusion is consistent with the results in FIG. 6. In summary, XPS analysis showed that the surface of samples of Example 9 comprised C, Li, O, and Si, the majority of Li was in the $Li_2CO_3$ state, and no significant level of SiC formation was detected.

Figure 8:
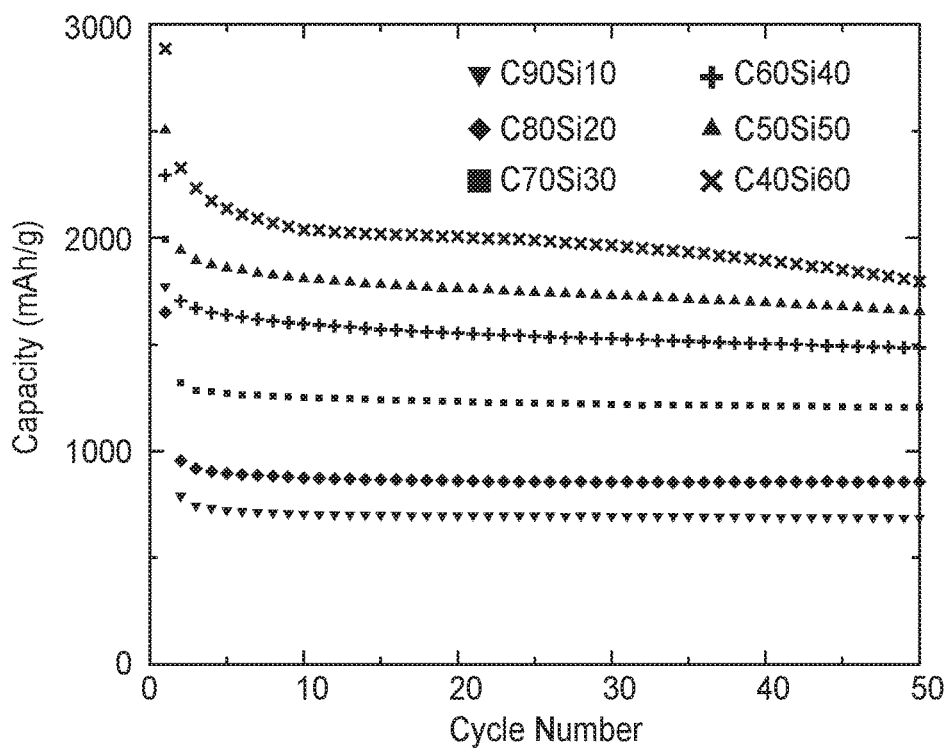
FIG. 8 is a graph of the capacity retention of half cells constructed from samples of Examples 6-11.

Coin half cells were assembled as described above using the 62.5 wt % of each Si:C alloy, 18 wt % Super C carbon black, and 19.5 wt % PI. FIG. 8 shows the capacity retention of the half cells. Table 5 summarizes the capacity, retention and coating volume expansion of half cells constructed using Examples 6-11. Examples 6-11 demonstrate very high retention, attaining up to 94% retention in the case of Si70C30 (Example 8). The volume expansion of Examples 6-11 is also very low for materials of this level of capacity.

TABLE 5

| Ex. | FIRST DISCHARGE (mAh/g) | FIRST CHARGE (mAh/g) | $50^{TH}$ DISCHARGE (mAh/g) | RETENTION (%) | COATING VOLUME EXPANSION (%) |
|---|---|---|---|---|---|
| 6 | 1765.2 | 737.5 | 677.5 | 92 | 21 |
| 7 | 1650.7 | 937.5 | 854.0 | 91 | 25 |
| 8 | 1993.4 | 1286.5 | 1204.1 | 94 | 68 |
| 9 | 2292.2 | 1682.5 | 1414.1 | 88 | 90 |
| 10 | 2504.8 | 1926.6 | 1654.6 | 86 | 122 |
| 11 | 2885.5 | 2314.9 | 1803.4 | 78 | 128 |

Comparative Example 1

A $Si_{40}C60$ alloy was synthesized by milling 0.331 g of Si (−325 mesh, 99.9%, Aldrich) with 0.212 g of graphite (Hitachi, MAG-E) with a Spex Mill, for 2 hours, with 57.5 g of 3/16" stainless steel balls. The final composition of Comparative Example 1 is therefore similar to Example 9, but Comparative Example 1 did not contain lithium in its synthesis and did not undergo delithiation.

Figure 9:
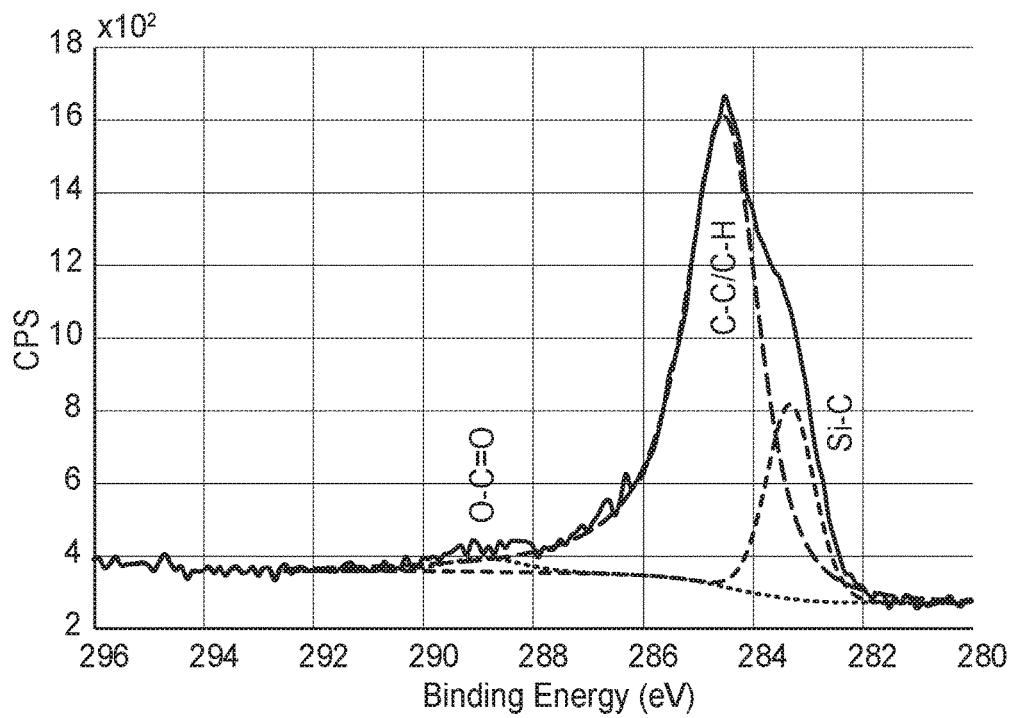
FIG. 9 shows an XPS C is core peak spectrum of Comparative Example 1.

Results of XPS analysis are provided in FIG. 9. Two peaks and a distinctive shoulder were detected in the C 1 s spectrum. The shoulder at low binding energy was assigned to C—Si carbon at ~283.4 eV. The major peak at ~284.6 eV was assigned to C in C—H or C—C environments. The second peak at ~290.0 eV was attributed to C atom in O—C=O that might be due to adventitious carbon species on the surface. Of note is the absence of a carbonate peak, and the presence of a SiC peak.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. An electrochemically active material comprising:
   (i) elemental silicon; and
   (ii) a transition metal selected from Ti, V, Cr, Mn, Fe, Co, Ni, Cu, Y, Zr, Nb, Mo, Ta, and W;
   wherein at least 50 mole % of the transition metal is present in its elemental state, based on the total number of moles of transition metal elements present in the electrochemically active material.

2. The electrochemically active material according to claim 1, further comprising carbon, wherein at least 50 mole % of the carbon is present in its elemental state, based on the total number of moles of carbon present in the electrochemically active material.

3. The electrochemically active material according to claim 1, wherein the electrochemically active material does not comprise carbon.

4. The electrochemically active material according to claim 1, wherein the one or more transition metal elements comprise iron.

5. The electrochemically active material according to claim 1, wherein any electrochemically active or electrochemically inactive phases present in the electrochemically active material are be distributed substantially homogeneously throughout the electrochemically active material.

6. The electrochemically active material according to claim 1, wherein the Scherrer grain size of each phase of the electrochemically active material is 50 nanometers or less.

7. The electrochemically active material according to claim 1, wherein the electrochemically active material comprises a silicon alloy material.

8. An electrode composition comprising:
   the electrochemically active material according to claim 1; and
   a binder.

9. An electrode composition according to claim 8, further comprising graphite.

10. A negative electrode comprising:
    the electrode composition according to claim 1; and
    a current collector.

11. An electrochemical cell comprising:
    the negative electrode of claim 10;
    a positive electrode comprising a positive electrode composition comprising lithium; and
    an electrolyte comprising lithium.

12. An electronic device comprising the electrochemical cell according to claim 11.

13. A method of making an electrochemical cell, the method comprising:
    providing a positive electrode comprising a positive electrode composition comprising lithium;
    providing a negative electrode according to claim 10;
    providing an electrolyte comprising lithium; and
    incorporating the positive electrode, negative electrode, and the electrolyte into an electrochemical cell.

14. A method of making an electrochemically active material according to claim 1, the method comprising:
    with a lithium-silicon alloy and one or more transition metal elements selected from Ti, V, Cr, Mn, Fe, Co, Ni, Cu, Y, Zr, Nb, Mo, Ta, and W, forming a lithium-containing alloy; and
    removing lithium from the lithium-containing alloy so as to give rise to an electrochemically active material according to claim 1.

15. The method according to claim 14, wherein removing the lithium from the lithium-containing alloy comprises exposing the lithium-containing alloy to an alcohol.

16. The method according to claim 14, wherein the lithium-containing alloy is formed from (i) the lithium-silicon alloy, (ii) the one or more transition metal elements selected from Ti, V, Cr, Mn, Fe, Co, Ni, Cu, Y, Zr, Nb, Mo, Ta, and W, and (iii) carbon, and wherein the electrochemically active material further comprises carbon, with at least 50 mole % of the carbon being present in its elemental state, based on the total number of moles of carbon present in the electrochemically active material.

17. The method according to claim 16, wherein removing the lithium from the lithium-containing alloy comprises exposing the lithium-containing alloy to an alcohol.

\* \* \* \* \*